United States Patent [19]

Mühlbacher

[11] 4,433,744
[45] Feb. 28, 1984

[54] BATTERY POWERED ELECTRIC MOTOR VEHICLE

[76] Inventor: Karl Mühlbacher, 12, Fischerhofweg, Graz, Austria

[21] Appl. No.: 300,555

[22] Filed: Sep. 9, 1981

[30] Foreign Application Priority Data

Sep. 30, 1980 [AT] Austria .................................. 4892/80

[51] Int. Cl.³ .............................................. B60K 1/00
[52] U.S. Cl. .................................... 180/65 E; 180/312
[58] Field of Search ...................... 180/65 E, 65 R, 56, 180/60, 62, 292, 293, 297, 299, 85, 88, 298, 291, 312

[56] References Cited

U.S. PATENT DOCUMENTS

| | | | |
|---|---|---|---|
| 1,321,258 | 11/1919 | Stinson | 180/297 X |
| 3,202,234 | 8/1965 | Osborne | 180/65 E |
| 3,939,732 | 2/1976 | Giacosa | 180/297 X |
| 4,057,121 | 11/1977 | Stedman | 180/56 |
| 4,161,226 | 7/1979 | Warner et al. | 180/65 E |

FOREIGN PATENT DOCUMENTS

| | | | |
|---|---|---|---|
| 91948 | 3/1923 | Austria | 180/65 E |
| 2720354 | 11/1977 | Fed. Rep. of Germany | . |
| 478536 | 9/1915 | France | 180/56 |
| 333052 | 11/1958 | Switzerland | 180/56 |

Primary Examiner—Joseph F. Peters, Jr.
Attorney, Agent, or Firm—Watson, Cole, Grindle & Watson

[57] ABSTRACT

A battery powered vehicle is provided with a vehicle frame and an electric motor whose main shaft is connected to a differential gear by means of a gear train with a variable transmission ratio, the motor shaft and all gear shafts being parallel to the axle of the driving wheels. In order to achieve a compact design and to avoid power-consuming drive elements the electric motor and the variable transmission gear as well as a potential reducing gear mounted between the latter and the differential gear, are positioned on a subframe which is connected to the housing of the driving wheel axle on the one side whereas the other side carrying the electric motor is attached to the vehicle frame by means of a cardanic suspension.

6 Claims, 6 Drawing Figures

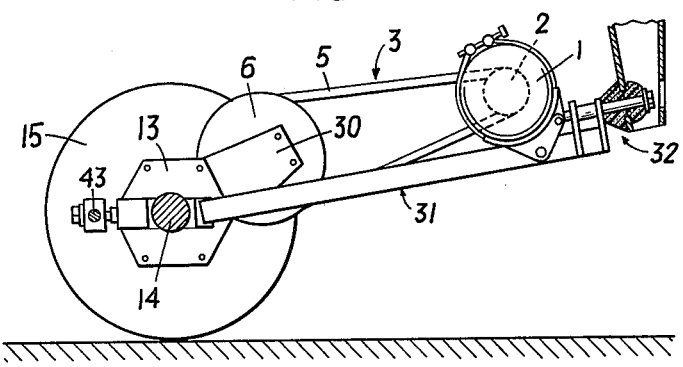
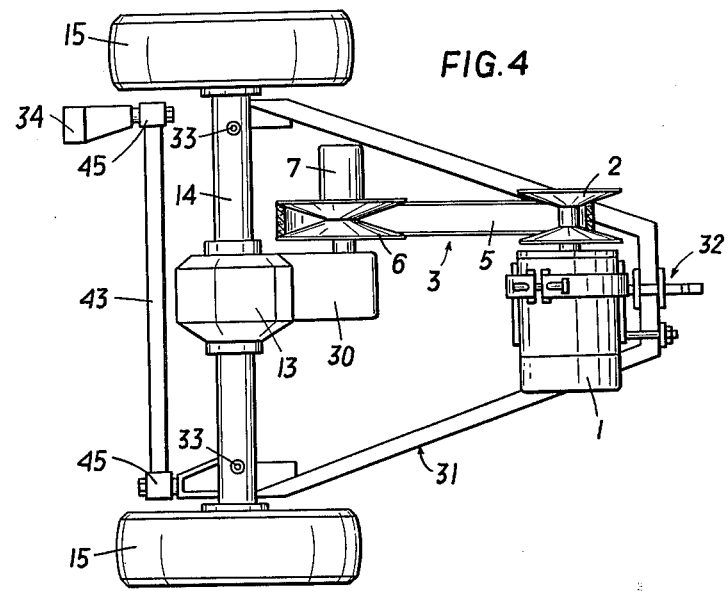
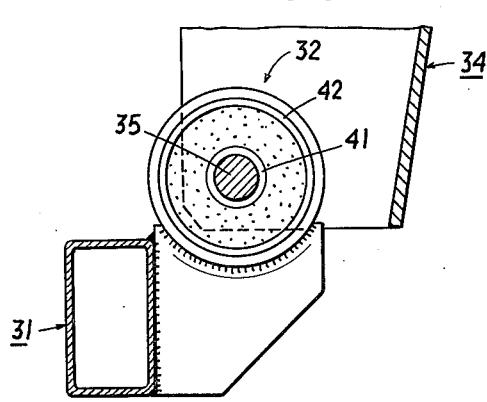
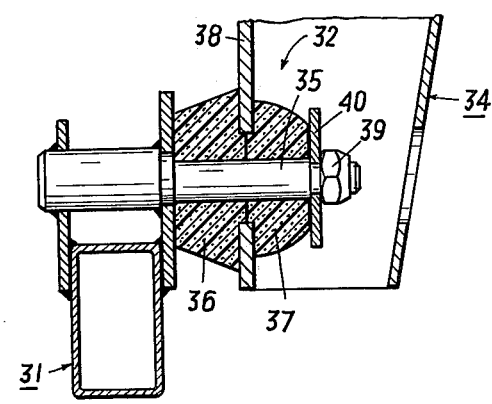

BATTERY POWERED ELECTRIC MOTOR VEHICLE

BACKGROUND OF THE INVENTION

The present invention relates to a battery-powered electric motor vehicle comprising a vehicle frame and an electric motor whose main shaft is connected to a differential gear by means of a gear train with a variable transmission ratio, with the differential gear driving the axle of the driving wheels of the electric motor vehicle, and with the motor shaft and all gear shafts being parallel to the axle of the driving wheels.

DESCRIPTION OF THE PRIOR ART

The German laid open print No. 27 20 354 contains a description of a battery-powered electric motor vehicle with a vehicle frame and an electric motor whose shaft is connected to a differential gear by way of a chain or belt drive or via a toothed wheel reducing gear. The driving mechanism of this vehicle is somewhat complicated and awkward as each output shaft of the differential gear is coupled to the individual rear wheel shafts by means of a separate chain drive, belt drive or toothed wheel gear.

Another known type of design comprises a mechanical gear with a continuously variable transmission ratio for the driving system between motor and driving wheels, which will permit an increase of the transmission ratio for the lower travelling speeds, thus keeping the motor speed within a range favorable with regard to both power consumption and motor efficiency. At the same time the vehicle will achieve a higher final velocity on level routes or when running without load. Vehicles of this type suffer from the drawback of a lower mechanical efficiency, however, due to the particular design of the driving system, which will impair the advantages of the continuously variable transmission gear.

SUMMARY OF THE INVENTION

It is an object of the present invention to eliminate the disadvantages of the above design variants and to provide an electric motor vehicle of the aforementioned type whose driving mechanism is characterized by a particularly simple and compact design resulting in a lower manufacturing cost. A further object is to avoid power consuming drive elements, e.g., additional gears, cardan and articulated joint shafts etc., and to attain an optimum efficiency of the driving system.

This is mainly achieved by placing the electric motor and the variable transmission gear as well as a potential reducing gear situated between the latter and the differential gear on a subframe, which is connected to the housing of the rigid-type driving wheel axle on the one side, whereas the other side carrying the electric motor is attached to the vehicle frame by means of a cardanic suspension; the axle housing may be aligned normally to the direction of motion by means of a transverse link whose one end is hinged to the vehicle frame while its other end is hinged to the axle housing itself.

Positioning the driving motor together with the variable transmission gear and—if necessary—the reduction gear on the subframe connected to the right axle will eliminate the need of cardan shafts or articulated joint shafts, thereby increasing the mechanical efficiency of the battery-powered driving system to a considerable extent. This will result in a better use of the fairly limited battery capacity of such an electric motor vehicle and will give a competitive advantage to the vehicle.

On the side of the driving motor which is comparatively heavy and susceptible to shocks, the subframe is attached to the vehicle frame by a cardanic bearing. This arrangement will reduce the vertical motion of the motor caused by whipping movements of the rigid axle in proportion to its distance from the bearing. The cardanic suspension will enable the rigid axle to swing around a horizontal axis parallel to the drive shaft if both wheels move uniformly, and to swing around a longitudinal axis as well if the wheels should encounter individual obstacles.

The cardanic suspension will transmit both the driving forces and the reaction torque of the drive onto the vehicle frame. According to another variant of the present invention the cardanic suspension comprises a bolt or pin carrying two blocks made of rubber or some similar elastic material which are designed for gripping between them a projection of the vehicle frame. In this way, both the driving forces and the reaction torque can be transmitted free of shock and structure-borne noise.

The present invention can be further enhanced by incorporating a free-wheel mechanism into the reducing gear, which can be locked with an electrically actuated mechanical coupling. This will permit the vehicle to roll out without any power consumption of the driving motor, and without having to overcome the mechanical gear friction losses and the brush friction of the motor. It will also enable the driving wheels to turn at a higher speed than the motor gear system after the power has been switched off.

DESCRIPTION OF THE DRAWING

Following is a more detailed description of various embodiments of the present invention as illustrated by the enclosed drawing, wherein

FIGS. 3 and 4 present a lateral view and a top view of one variant of a driving system designed according to the invention;

FIGS. 5 and 6 are views of two variants of a cardanic suspension for attaching the subframe to the main frame of the vehicle.

DESCRIPTION OF THE PREFERRED EMBODIMENTS

Figure 1:
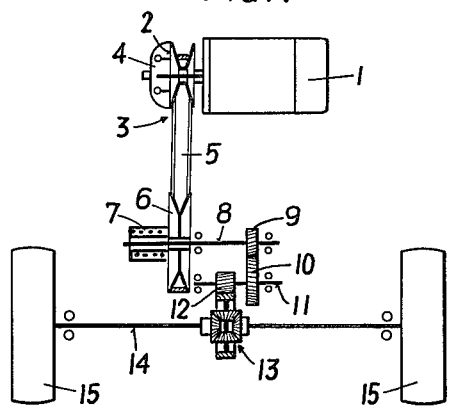
FIGS. 1 and 2 are schematical views of two variants of the power flow from the driving motor to the driving wheels of an electric motor vehicle designed according to the invention.

According to FIG. 1 a d.c. driving motor 1 is connected to the driving pulley 2 of a continuously variable transmission gear 3. The gear 3 is of the broad V-belt type and is provided with a set of centrifugal weights 4 at the driving pulley 2, permitting the transmission of the gear 3, as given by the position of the V-belt 5 on the driving pulley 2 and on the driven pulley 6, to be varied continuously depending on the speed of the driving motor 1. The driven pulley 6 which is loaded by a spring 7 for tightening the V-belt 5, is directly mounted on a pinion shaft 8 whose bearings are indicated schematically only and which carries a pinion 9 opposite of the driven pulley 6. Via the pinion 9 which is meshing with a spur wheel 10 on another shaft 11, the speed of the driving motor 1, which has been reduced via gear 3, is being further reduced, and is transmitted to the differential gear 13 of the rigid-type axle 14 of the driving wheels 15 by way of another pinion 12 sitting on the end of the second pinion shaft 11 opposite of the spur wheel 10. In principle, this driving system is employed in the variant present in FIGS. 3 and 4, where it will be discussed in greater detail.

Figure 2:
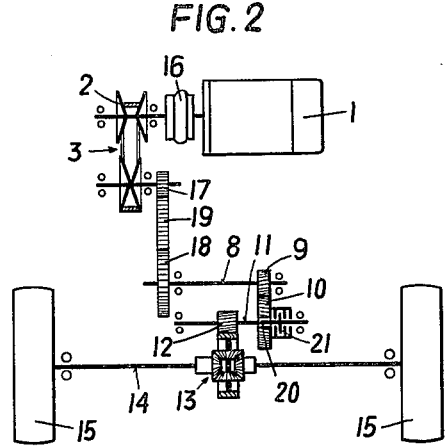

The driving system of FIG. 2 differs from that of FIG. 1 by the inclusion of a few additional elements only; e.g., by an elastic coupling 16 which is added between the driving motor 1 and the continuously variable gear 3 and which is used for equalizing fluctuations in the transmitted torque while permitting minor relative movements between the motor shaft and the shaft of the driving pulley 2 of the gear 3. The continuously variable gear 3 is conceived as a chain gear, whose servo-mechanism required for control purposes is not shown here. The torque is transmitted from gear 3 via two toothed belt pulleys 17, 18 and a toothed belt 19 onto the first pinion shaft 8, and from there via spur wheels 9, 10, the second pinion shaft 11 and pinion 12 onto the differential gear 13 of the rigid axle 14 of the driving wheels 15. Although the design of a continuously variable gear conceived as a chain gear is more complex than that of the V-belt variety, this variant may be preferable on account of its greater mechanical efficiency.

In the variant illustrated in FIG. 2 the hub of the spur wheel 10 on the second shaft 11 contains a free-wheel mechanism 20 which will transmit torque in one direction only, i.e., if the driving motor 1 is running in the forward direction and is driving the electric motor vehicle (which is not shown here). If the electric motor vehicle is rolling faster than would correspond to the speed of the driving motor 1, or if the motor is switched off, the free-wheel mechanism 20 will automatically interrupt torque transmission from the motor 1 to the driving wheels 15. For transmission of the reverse torque in the case of reverse vehicle motion and when braking electrically by means of the motor 1, it will also be possible to automatically bypass the free-wheel mechanism 20 both when braking with the motor and when the motor is in reverse gear, via the schematically indicated clutch 21, e.g., a multiple disk clutch, which is activated by an electric circuit (not shown).

As indicated in FIGS. 3 and 4, the driving motor 1, the continuously variable gear 3 and the reducing gear 30 of the electric motor vehicle specified by the invention are mounted on a subframe 31 which is connected to the right-type axle 14 of the driving wheels 15. The driving motor 1 is positioned on the side of the subframe 31 opposite of the rigid axle 14 in such a way that its main shaft as well as all gear shafts of both the continuously variable gear 3 and the reducing gear 30 are parallel to the rigid axle 14. Positioning the driving system on the subframe 31 connected to the rigid axle axis will ensure that the shafts remain in parallel and that the belts or chains of the continuously variable gear 3 remain properly aligned even during movements of the driving wheels 15 or the rigid axle 14, without necessitating the use of cardan shafts for torque transmission from the motor 1 onto the driving wheels 15, which would impair the mechanical efficiency of the driving system.

In order to keep the unsprung masses of the rigid axle 14 and of the entire driving system at a minimum, the reducing gear 30 and the differential gear 13 may be provided with housings of a lightweight construction type, preferably made of light alloy.

In the vicinity of heavy-weight driving motor 1 which is rather sensitive to shock, the trapezoidal subframe 31 is attached to a cardanic suspension 32, while spring elements (not shown), e.g., acting on the points 33, are used for its support in the vicinity of the rigid axle 14. This will reduce the vertical movements of the driving motor 1 caused by the spring motion of the driving wheels 15 or the rigid axle 14, in proportion to the distances of the individual parts from the cardanic suspension 32. Due to the cardanic suspension 32 the rigid axle 14 can swing around a horizontal axis parallel to itself, if the two driving wheels 15 move uniformly; if they encounter individual obstacles the rigid shaft 14 may also swing around a longitudinal axis. The cardanic suspension 32 will transmit both driving forces and reaction torque of the drive to the vehicle frame.

FIGS. 5 and 6 represent two variants of a cardanic suspension 32 by which the subframe 31 is attached to the main frame 34 of the vehicle. In FIG. 6 the suspension is achieved by an elastic pin support. A bolt 35 is welded to the apex of the subframe 31 and is provided with two rubber blocks 36, 37 of the shape of a truncated cone, which are mounted on the vehicle frame 34 in front and at the back of a supporting plate 38 and are pressed together by a disk 40 and a self-locking nut 39. This type of suspension 32 will permit both axial transmission of driving and braking forces and the transmission of torque by a radial component. Along with the possibility of rotation around the axis of the bolt 35, the elastic rubber blocks 36, 37 provide the suspension with the characteristics of a universal joint.

According to FIG. 5 the suspension 32 is designed as a silent block bearing fulfilling the same function as the pin support of FIG. 6. In this case, the subframe 31 swings around the longitudinal axis of the electric motor vehicle (not shown) by tilting the interior ring 41 against the exterior ring 42 of the rubber bearing which is relatively short but has a large diameter.

As can be seen from FIGS. 3 and 4, the rigid axle 14 is aligned normally to the direction of vehicle motion by means of a transverse line 43 of the Panhard rod type, whose one end is hinged to an end of the rigid axle 14 by a flexible joint 45 while its other end is hinged to the vehicle frame 34 in an identical manner.

I claim:

1. A battery-powered electric motor vehicle comprising a vehicle frame and an electric motor with a main shaft being connected to a differential gear by means of a gear train with a continuously variable transmission ratio, with said differential gear driving a rigid-type axle of the driving wheels of said electric motor vehicle, and with said main shaft and all gear shafts being parallel to said axle of said driving wheel, wherein said electric motor and said variable transmission gear are mounted on a subframe, which is connected to a housing of said rigid-type axle on the one side, whereas the other side thereof, which is carrying said electric motor, is attached to said vehicle frame by means of a cardanic suspension, and a transverse link having one end hinged to said vehicle frame and its other end hinged to said axle housing whereby said axle housing can be aligned normally to the direction of motion by means of said link.

2. A vehicle as in claim 1, additionally comprising a reducing gear between said variable transmission gear and said differential gear, which is also mounted on said subframe.

3. A vehicle as in claims 1 or 2, wherein said cardanic suspension comprises a bolt carrying two blocks made of elastic material which are designed for gripping between them a projection of said vehicle frame.

4. A vehicle as in claim 1, wherein a free-wheel mechanism is incorporated into said reducing gear, which can be locked with an electrically actuated mechanical coupling.

5. A vehicle as in claim 2, wherein a free-wheel mechanism is incorporated into said reducing gear, which can be locked with an electrically actuated mechanical coupling.

6. A vehicle as in claim 3, wherein a free-wheel mechanism is incorporated into said reducing gear, which can be locked with an electrically actuated mechanical coupling.

* * * * *